Figures 1, 2:
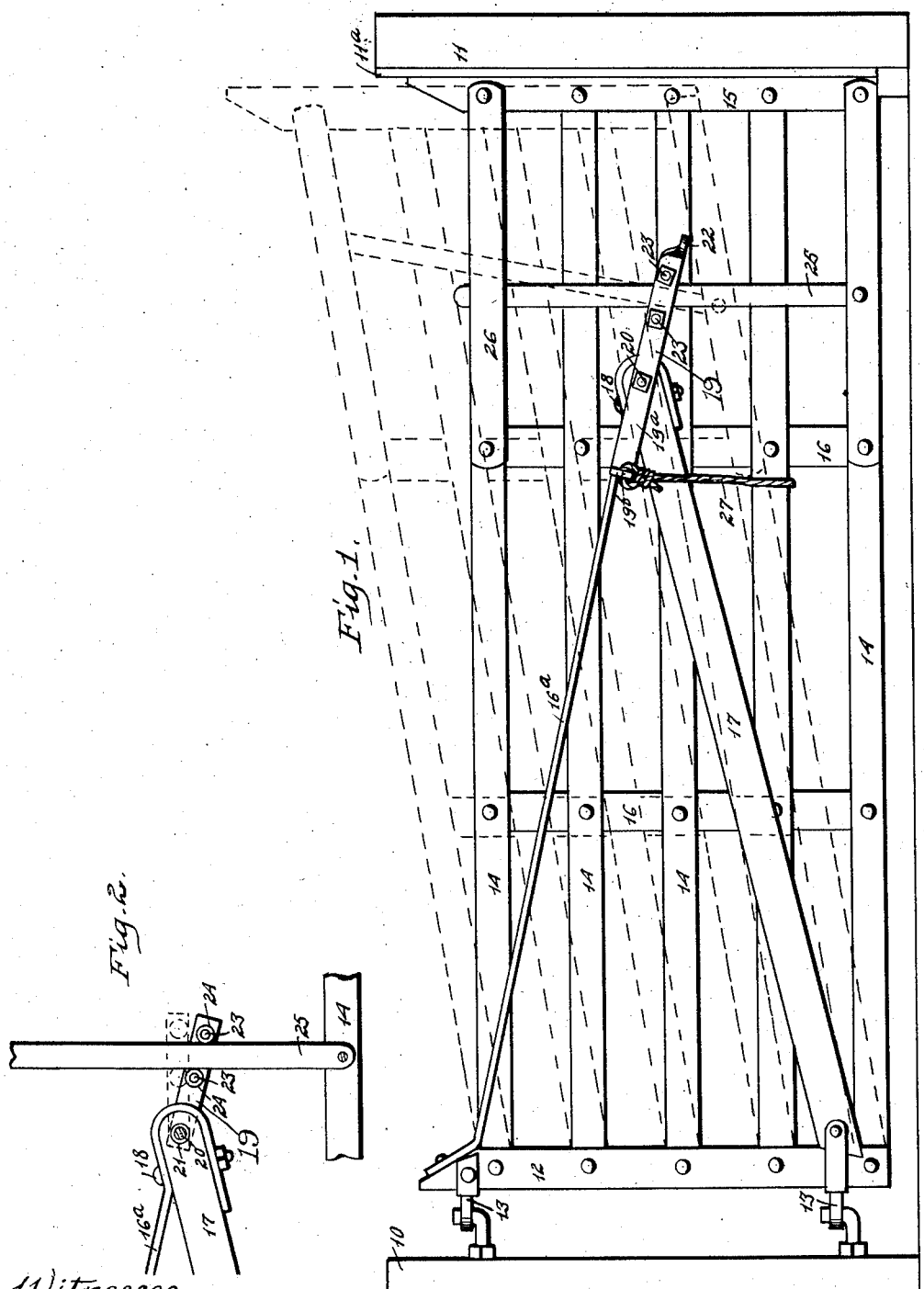

J. GANZLEY.
GATE.
APPLICATION FILED OCT. 26, 1911.

1,025,910.

Patented May 7, 1912.

Witnesses
W. A. Loftus
A. H. Hague

Inventor
John Ganzley
by J. Ralph Orwig Atty.

UNITED STATES PATENT OFFICE.

JOHN GANZLEY, OF TAINTOR, IOWA.

GATE.

1,025,910.     Specification of Letters Patent.    Patented May 7, 1912.

Application filed October 26, 1911. Serial No. 656,820.

*To all whom it may concern:*

Be it known that I, JOHN GANZLEY, a citizen of the United States, residing at Taintor, in the county of Mahaska and State of Iowa, have invented a certain new and useful Gate, of which the following is a specification.

The object of my invention is to provide a gate of simple, durable and inexpensive construction, which is easily and readily secured in its closed position and quickly and easily released therefrom, and moved to its open position.

A further object is to provide a gate, the free end of which may be easily raised while the gate is closed so that small animals can pass under the gate while it is in its closed position, which gate when the free end is raised still higher will be released and may be swung open.

A further object is to provide means whereby a gate is automatically secured in any position of its upward movement so that it will clear any object in its path when moved from one position to another of its movement.

A further object is to provide a gate which is easily released from its raised position and dropped to its closed position and which is easily operated by a person on either side of the gate.

A further object is to provide a gate so constructed that it can be quickly and easily adjusted to overcome any sagging.

My invention consists in the construction, arrangement, and combination of the various parts of the device, whereby the objects contemplated are attained, as hereinafter more fully set forth, pointed out in my claims, and illustrated in the accompanying drawings, in which—

Figure 1 shows a side elevation of the gate embodying my invention, the dotted line showing the free end of the gate in its raised position and Fig. 2 shows a detail, sectional view of part of the mechanism for holding the gate in its raised position.

In the accompanying drawings, I have used the reference numeral 10 to indicate a post to which the gate is hinged. A second post 11 is designed to be engaged by the free end of the gate when the gate is closed.

My gate proper, consists of upright end members 12 and 15. The end member 12 is hinged to the post 11 by means of hinges 13 which are of any suitable construction. A series of horizontal parallel gate members 14 are pivoted at their respective ends to the upright members 12 and 15. I preferably employ intermediate upright members 16 spaced apart from each other and from the upright end members and pivoted to the respective horizontal members 14.

On the side of the post 11 adjacent to the gate proper, I provide a longitudinal, vertical groove or recess which may be made by securing to the surface of the post 11, two parallel upright pieces 11$^a$ spaced apart from each other and forming the groove between them.

Secured to the member 12 near each end thereof are arms 16$^a$ and 17 which are inclined forwardly and toward each other and are secured to each other at a point near the free end of the gate and approximately midway between the top and bottom of the gate. The arms 16 and 17 may be of any suitable construction. In the drawings, I have shown the arm 17 in the form of a bar and the arm 16 in the form of a flat metal strip which I make of iron having its end bent U shaped to receive the end of the arm 17 and secured thereto by means of the bolt 18.

Pivoted on the end of the arm 17 are parallel bars 19. The bars 19 are pivoted on the arm 17 by means of a bolt 20 which extends through both the bars 19 and the arm 17. On the bolt 20 between the bars 19 is a sleeve 21 designed to take the wear of the bolt 20. On the forward end of the outer bar 19 is a handle 22. The outer bar 19 is provided with a rearward extension 19$^a$ on which is a lateral extension 19$^b$. Mounted near the forward end of the bars 19 are two parallel bolts 23 extending through the bars 19. On the bolts 23 between the bars 19 are sleeves 24. The bolts 23 are spaced apart from each other for the purpose hereinafter explained. Pivotally mounted on the lower horizontal member 14 near the free end of the gate is an upright member 25. Secured to the top horizontal member 14 and spaced apart therefrom at the free end of the gate is a bar 26. The member 25 extends upwardly between the bar 26 and the top horizontal member 14 as shown in Fig. 1, and moves freely in the space between said bar 26 and said top horizontal member 14. The member 25 extends between the bars 19 and between the bolts 23. It will be seen that the arms 16 and 17 are held adjacent to the gate members 14 by means of the bars 19 and the member 25.

The parts heretofore described are so constructed and arranged that in the practical operation of my gate when the latter is in its closed position, it enters between the upright members 11ª and the gate is firmly held in its closed position. No amount of lateral pushing on the gate can open it. The free end of the gate can be freely raised or lowered on account of the pivotal connection of the members 14 and the members 12 and 15. When the free end of the gate is raised for a short distance, and allowed to drop, the sleeves 24 on the bolt 23 will engage the upright member 25 and prevent the return of the free end of the gate to horizontal position. By raising the free end only a short distance, the end member 15 will remain between the upright members 11ª and a space will be left beneath the gate which will permit small animals to pass under the gate. By raising the free end of the gate a little higher, the upright member 25 will be frictionally engaged by the sleeves 24 and the member 15 will be freed from engagement with the members 11ª. The gate can then be easily and readily swung open from its raised position shown by the dotted lines in Fig. 1, and will clear objects in its path. When it is desired to close the gate, it is moved to position where the upright members 15 will drop between the members 11ª and the handle 22 is lifted. The upright member 25 is thus released and the gate is dropped and secured in its closed position. For convenience in releasing the upright member 25 from the opposite side of the gate, I have provided a rope or chain 27 which is secured to the extension 19ᵇ and extends beneath one of the lower members 14 and is loosely secured in any suitable place on the other side of the gate. A pull on the rope 27 will draw the extension 19ª downwardly and release the upright member 25. It is to be noted that the ends of the bars 19, adjacent to the free end of the gate, tend to drop down on account of their weight. The bolts 23 and the sleeves 24 are spaced apart from each other at a sufficient distance to allow slight play of the upright member 25. The upright member 25 is so located with relation to the bolt 20 that the arms 19 are inclined forwardly and slightly downwardly from the bolt 20 when the gate is closed as shown in Fig. 1. When the free end of the gate is raised, the member 25 is frictionally engaged between the sleeves 23 and held in position. The action of the parts just mentioned in securing the upright member 25 when the gate is raised is automatic.

It will be seen that my gate has a number of advantages, among which is the ease with which it is adjusted to account for any sagging of the gate frame. The free end is readily and easily secured in any position of its movement up or down. When the gate is swung open in its raised position, it will clear any ordinary obstacle in its path and may be opened on a side hill or the like. It is readily released from its raised position from either side and when secured in its closed position cannot be opened by stock. The mechanism for securing the gate in various positions of the movement of its free end is of simple construction which will not readily get out of order and is easy to repair or replace.

In the following claims and in this description in referring to the inner end of the gate, I mean its hinged end. In the claims, by the term rope, I mean to include a chain or anything else suitable for the purpose.

I claim as my invention:

1. In a device of the class described, a post, a gate proper comprising upright end members, the inner end member being hinged to said post, a plurality of parallel horizontal gate members pivoted at their respective ends to said upright end members and means whereby the free end of said gate is automatically secured in any position of its upward movement, said means comprising arms secured to the inner upright member and inclined toward and secured near the middle of the free end of the gate, parallel bars pivoted to one of said arms and spaced apart from each other, parallel bolts extending through said arms, an upright member pivoted to the gate at one end and extending between said bars and said bolts, and means for permitting longitudinal and preventing lateral movement of the other end of said last named upright member, with relation to the gate.

2. In a device of the class described, a post, a gate proper comprising upright end members, the inner end member being hinged to said post, a plurality of parallel horizontal gate members pivoted at their respective ends to said upright end members and means whereby the free end of said gate is automatically secured in any position of its upward movement, said means comprising arms secured to the inner upright member and inclined toward and secured together near the middle of the free end of the gate, parallel bars pivoted to one of said arms and spaced apart from each other, parallel bolts extending through said arms, sleeves mounted on said bolts between the said arms, a laterally extending handle on one of said arms, a rearward extension on one of said arms, means for drawing said extension downward, said means extending to the other side of the gate, an upright member pivoted to the lower horizontal member of the gate near the free end thereof and extending upwardly between said bars and between said bolts, and means for permitting longitudinal and for preventing lateral movement of the upper end of said last named upright member with relation to said gate.

3. In a device of the class described, a post, a gate proper comprising upright end members, the inner end member being hinged to said post, a plurality of parallel horizontal gate members pivoted at their respective ends to said upright end members and means whereby the free end of said gate is automatically secured in any position of its upward movement, said means comprising arms secured to said inner upright end member and inclined toward and secured to each other near the free end of the gate, a sleeve mounted in one of said arms at right angles thereto, a bolt rotatably mounted in said sleeve, parallel arms secured to the respective ends of said bolt, parallel bolts mounted in said arms adjacent to the free end of the gate, spaced apart from each other, sleeves on said last named bolts, an upright member pivoted to the lower horizontal member of the gate near the free end thereof, and extending upwardly between said bars and between said bolts and means for permitting longitudinal and for preventing lateral movement of the upper end of said last named upright member with relation to said gate.

Des Moines, Iowa, Oct. 17, 1911.

JOHN GANZLEY.

Witnesses:
 JOHN W. NEEDHAM,
 F. E. QUIRE.

Copies of this patent may be obtained for five cents each, by addressing the "Commissioner of Patents, Washington, D. C."